(12) United States Patent
Slater

(10) Patent No.: US 12,536,366 B2
(45) Date of Patent: Jan. 27, 2026

(54) FONT AUTO-ACTIVATION

(71) Applicant: Celartem, Inc., Tigard, OR (US)

(72) Inventor: Chadlee R. Slater, Tigard, OR (US)

(73) Assignee: Celartem, Inc., Tigard, OR (US)

( * ) Notice: Subject to any disclaimer, the term of this patent is extended or adjusted under 35 U.S.C. 154(b) by 233 days.

(21) Appl. No.: 18/535,711

(22) Filed: Dec. 11, 2023

(65) Prior Publication Data

US 2024/0232508 A1 Jul. 11, 2024

Related U.S. Application Data

(60) Provisional application No. 63/438,340, filed on Jan. 11, 2023.

(51) Int. Cl.
*G06F 17/00* (2019.01)
*G06F 40/109* (2020.01)

(52) U.S. Cl.
CPC ................. *G06F 40/109* (2020.01)

(58) Field of Classification Search
CPC ..................................... G06F 40/109
See application file for complete search history.

(56) References Cited

U.S. PATENT DOCUMENTS

| | | | |
|---|---|---|---|
| 4,594,674 A | 6/1986 | Boulia et al. | |
| 5,533,180 A | 7/1996 | Zhou et al. | |
| 5,586,241 A | 12/1996 | Bauermeister et al. | |
| 5,586,242 A | 12/1996 | McQueen, III et al. | |
| 5,990,907 A | 11/1999 | Colletti | |
| 6,111,654 A | 8/2000 | Cartier et al. | |
| 6,512,531 B1 | 1/2003 | Gartland | |
| 6,826,728 B1 | 11/2004 | Horiyama | |
| 6,882,344 B1 | 4/2005 | Hayes et al. | |
| 7,197,707 B2 | 3/2007 | Cicchitelli et al. | |
| 7,346,845 B2 | 3/2008 | Teshima | |
| 7,403,297 B2 | 7/2008 | Engelman et al. | |
| 7,478,325 B2 | 1/2009 | Foehr et al. | |

(Continued)

FOREIGN PATENT DOCUMENTS

| | | | |
|---|---|---|---|
| JP | H06-266334 A | 9/1994 | |
| JP | H09-146521 A | 6/1997 | |

(Continued)

OTHER PUBLICATIONS

[No Author Listed], "Font Reserve Reviewer's Guide-Version 3.1," MacOS, 2003, 18 pages.

(Continued)

*Primary Examiner* — Laurie A Ries
(74) *Attorney, Agent, or Firm* — Fish & Richardson P.C.

(57) ABSTRACT

Aspects related to a font activation platform are provided. The platform may monitor user input to a computing device. The platform may identify a target asset for retrieval. The platform may extract one or more fonts from the target asset. The platform may store the one or more fonts to a staging location. The platform may generate one or more font activation rules corresponding to the one or more fonts. The platform may automatically activate the one or more fonts based on the one or more font activation rules. The platform may monitor the target asset to identify one or more font changes. The platform may update the one or more font activation rules based on the one or more font changes.

20 Claims, 11 Drawing Sheets

(56) References Cited

U.S. PATENT DOCUMENTS

| | | | |
|---|---|---|---|
| 7,539,939 | B1 | 5/2009 | Schomer |
| 7,583,393 | B2 | 9/2009 | Hodder et al. |
| 7,761,811 | B1 | 7/2010 | Chaudhri |
| 7,958,448 | B2 | 6/2011 | Fattic et al. |
| 8,555,162 | B2 | 10/2013 | Bacus et al. |
| 9,519,625 | B2 | 12/2016 | Bacus |
| 9,542,538 | B2 * | 1/2017 | Le Chevalier .......... G06F 16/94 |
| 10,445,408 | B2 * | 10/2019 | Sinn .................... G06F 3/04842 |
| 10,592,590 | B2 * | 3/2020 | Pao ........................ G06Q 20/123 |
| 11,947,896 | B2 * | 4/2024 | O'Donovan ........... G06V 10/82 |
| 2001/0011364 | A1 | 8/2001 | Stoub |
| 2001/0021937 | A1 | 9/2001 | Cicchitelli et al. |
| 2002/0010723 | A1 | 1/2002 | Nielsen |
| 2002/0010725 | A1 | 1/2002 | Mo |
| 2002/0136578 | A1 | 9/2002 | Johnson et al. |
| 2003/0002063 | A1 | 1/2003 | Oomura et al. |
| 2003/0046314 | A1 | 3/2003 | Morooka |
| 2003/0131321 | A1 | 7/2003 | Teshima |
| 2004/0088657 | A1 | 5/2004 | Brown et al. |
| 2004/0177056 | A1 | 9/2004 | Davis et al. |
| 2005/0080839 | A1 | 4/2005 | Kuwata et al. |
| 2005/0193336 | A1 | 9/2005 | Fux et al. |
| 2006/0069992 | A1 | 3/2006 | Hodder |
| 2006/0075341 | A1 | 4/2006 | Lin et al. |
| 2006/0225038 | A1 | 10/2006 | Okabe |
| 2007/0086031 | A1 | 4/2007 | Li |
| 2007/0226615 | A1 * | 9/2007 | Johnson .................. G06T 11/60 |
| | | | 715/764 |
| 2007/0242072 | A1 | 10/2007 | Fattic et al. |
| 2007/0263240 | A1 | 11/2007 | Hirai |
| 2008/0024806 | A1 | 1/2008 | Bacus et al. |
| 2009/0185222 | A1 | 7/2009 | Foehr et al. |
| 2009/0284778 | A1 | 11/2009 | Hodder et al. |
| 2011/0090229 | A1 | 4/2011 | Bacus et al. |
| 2011/0273734 | A1 | 11/2011 | Bacus |
| 2013/0215126 | A1 * | 8/2013 | Roberts .................. G06Q 30/06 |
| | | | 345/522 |
| 2014/0047329 | A1 * | 2/2014 | Levantovsky ...... G06F 16/9577 |
| | | | 715/269 |
| 2014/0136957 | A1 * | 5/2014 | Kaasila ................ G06F 40/109 |
| | | | 715/235 |
| 2014/0280693 | A1 * | 9/2014 | Schwanitz .............. H04L 67/04 |
| | | | 709/217 |
| 2015/0234795 | A1 * | 8/2015 | Villaron ................ G06F 40/166 |
| | | | 715/202 |
| 2016/0078004 | A1 * | 3/2016 | Butler ..................... G06F 21/10 |
| | | | 715/269 |
| 2016/0334946 | A1 * | 11/2016 | Chiang ............... G06F 3/04883 |
| 2017/0004113 | A1 * | 1/2017 | Gore ..................... G06F 40/109 |
| 2019/0260728 | A1 * | 8/2019 | Gupta ..................... H04L 67/02 |
| 2021/0136458 | A1 * | 5/2021 | Carney ........... H04N 21/47202 |

FOREIGN PATENT DOCUMENTS

| | | |
|---|---|---|
| JP | 2003-015849 A | 1/2003 |
| JP | 2003-058528 A | 2/2003 |
| JP | 2007-304764 A | 11/2007 |
| JP | 2009-086879 A | 4/2009 |
| WO | WO 2007050816 A2 | 5/2007 |
| WO | WO-2025138010 A1 * | 7/2025 ........... G06F 40/109 |

OTHER PUBLICATIONS

Blog.typekit.com [online], "Adobe Typekit Blog: InDesign Font Conflicts," May 8, 2008, retrieved on Apr. 14, 2025, retrieved from URL<https://blog.typekit.com/2008/05/08/indesign_font_conflicts/>, 6 pages.

Creativepro.com [online], "Extensis Suitcase 10: Heir to the Font-Management Throne?" Jul. 31, 2001, retrieved on Apr. 14, 2025, retrieved from URL <https://creativepro.com/extensis-suitcase-10-heir-to-the-font-management-throne/>, 9 pages.

Extended European Search Report in European Appln. No. 11165196.4, mailed on Jun. 24, 2014, 6 pages.

International Search Report and Written Opinion in International Appln. No. PCT/US2006/041894, mailed on Oct. 22, 2007, 13 pages.

Probets et al., "Substituting Outline Fonts for Bitmap Fonts in Archived PDF files," Software-Practice and Experience, Jun. 25, 2003, 33(9):885-899.

Tidbits.com [online], "Fontastic Voyage: Font Reserve 2.5," Mar. 6, 2000, retrieved on Apr. 14, 2025, retrieved from URL<https://tidbits.com/2000/03/06/fontastic-voyage-font-reserve-2-5/>, 5 pages.

* cited by examiner

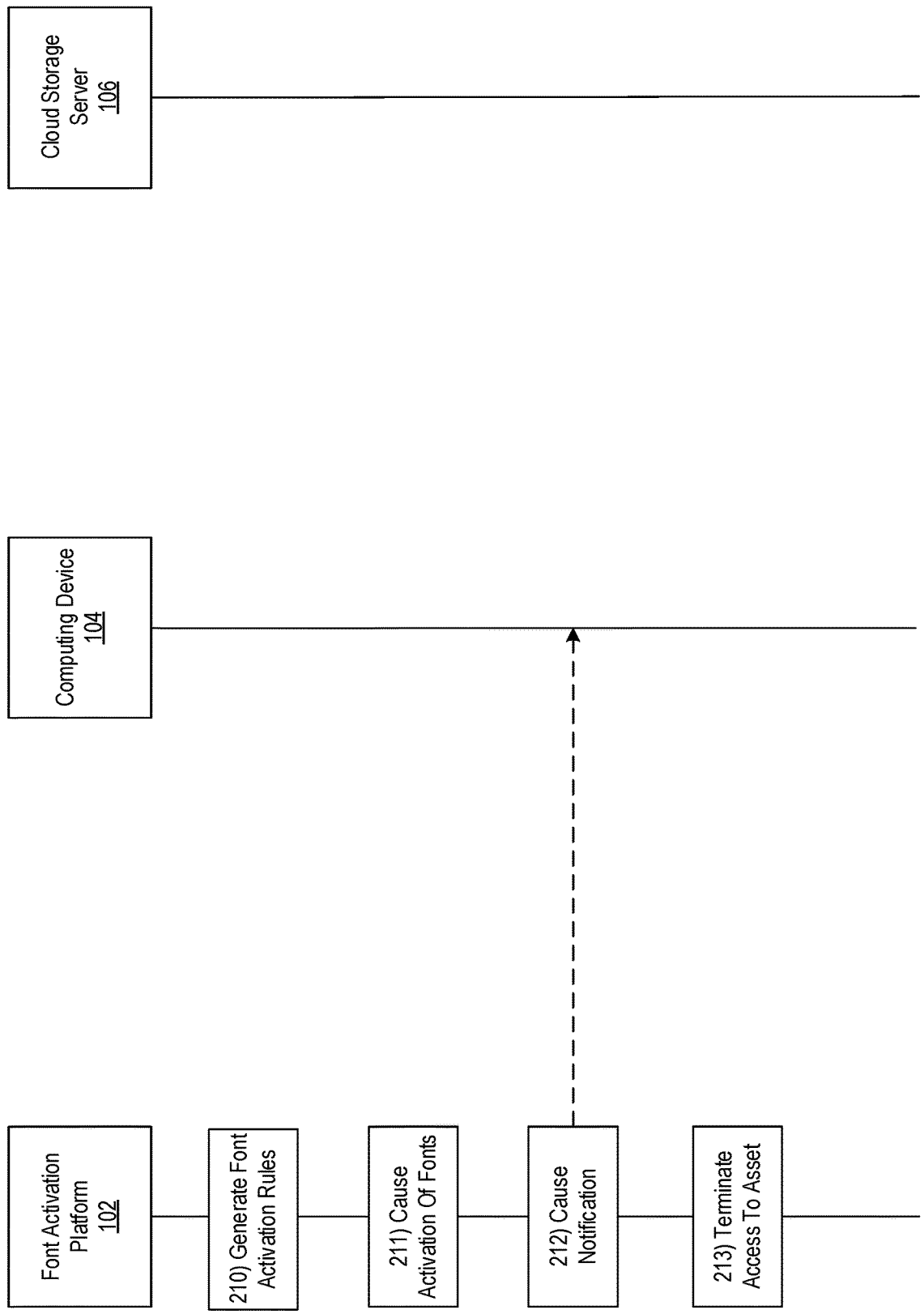

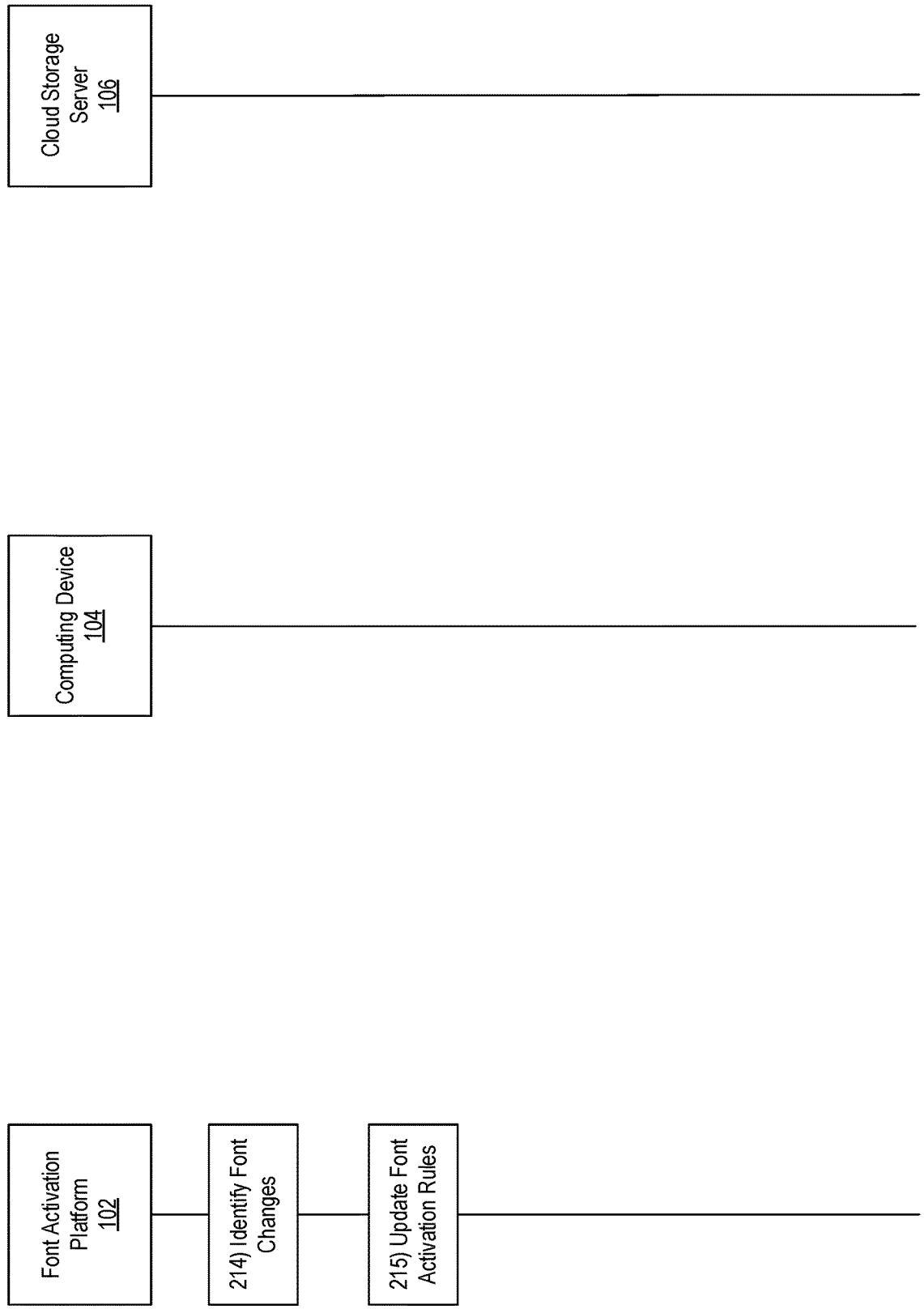

FONT AUTO-ACTIVATION

CROSS REFERENCE TO RELATED APPLICATIONS

This application claims the benefit of and priority to U.S. Provisional Application No. 63/438,340, filed Jan. 11, 2023, and titled Font Auto-Activation, which is incorporated herein by reference in its entirety.

BACKGROUND

Aspects of the disclosure relate to performing font auto-activation using a computing platform. In some instances, users of a system may use a host application to edit one or more text elements of a document. In some conventional examples, the host application may provide a dedicated plugin software development kit (SDK) that implements a process via a plugin to intercept a document-open event request and activate one or more fonts corresponding to the text elements of the document. However, in these arrangements, automatic activation of these fonts may be a function limited only to host applications that provide these plugin SDKs. In some examples, each SDK might have unique requirements, and therefore a unique plugin may be required for each host application. Accordingly, it may be important to identify methods for performing font auto-activation without the need for a unique plugin, in order to improve the efficiency and accessibility of font auto-activation.

SUMMARY

Aspects of the disclosure provide effective, efficient, scalable, and convenient technical solutions that address and overcome the technical problems associated with font auto-activation. In accordance with one or more arrangements of the disclosure, a computing platform with at least one processor, a communication interface, and memory storing computer-readable instructions may receive, from a computing device, one or more requests to retrieve a target asset. The computing platform may retrieve the target asset from a cloud storage server, in response to receiving the one or more requests. The computing platform may extract information specifying one or more fonts included in the target asset from the target asset. The computing platform may store the one or more fonts to a staging location. The computing platform may generate one or more font activation rules based on the one or more fonts. The computing platform may activate the one or more fonts based on the one or more font activation rules. The computing platform may send one or more commands directing the computing device to access the target asset corresponding to the activated one or more fonts after activating the one or more fonts.

In one or more arrangements, the computing platform may monitor the target asset. Monitoring the target asset may include identifying font changes within the target asset. The computing platform may update the one or more font activation rules based on identifying the font changes within the target asset. In one or more examples, the computing platform may deactivate the one or more fonts based on receiving a request to terminate access to the target asset.

In one or more arrangements, the one or more requests to retrieve the target asset may include one or more of: mouse clicks, keyboard commands, user input selecting a menu option, and/or user input directing the computing platform to edit the target asset. In one or more examples, the target asset may be and/or include one or more documents (e.g., text documents, HTML documents, portable document format (PDF) documents, or the like). In one or more arrangements, the one or more font activation rules may include an executable script. The executable script may be configured to automatically activate the one or more fonts specified by the information extracted from the target asset, prior to opening the target asset, based on the computing platform executing the executable script.

In one or more examples, the computing platform may be managed by a remote computing device associated with a provider of font activation services. In one or more arrangements, the staging location may include one or more of: internal memory of the computing device, external memory of a second computing device associated with the computing platform, and/or a cloud-based storage system. In one or more examples, the one or more font activation rules may include one or more of: a rule to activate one or more fonts using temporary global activation, a rule to activate one or more fonts using temporary private activation, and/or a rule to activate one or more fonts using permanent font activation.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2D depict an illustrative event sequence for font auto-activation in accordance with one or more example arrangements;

DETAILED DESCRIPTION

Figure 1A:
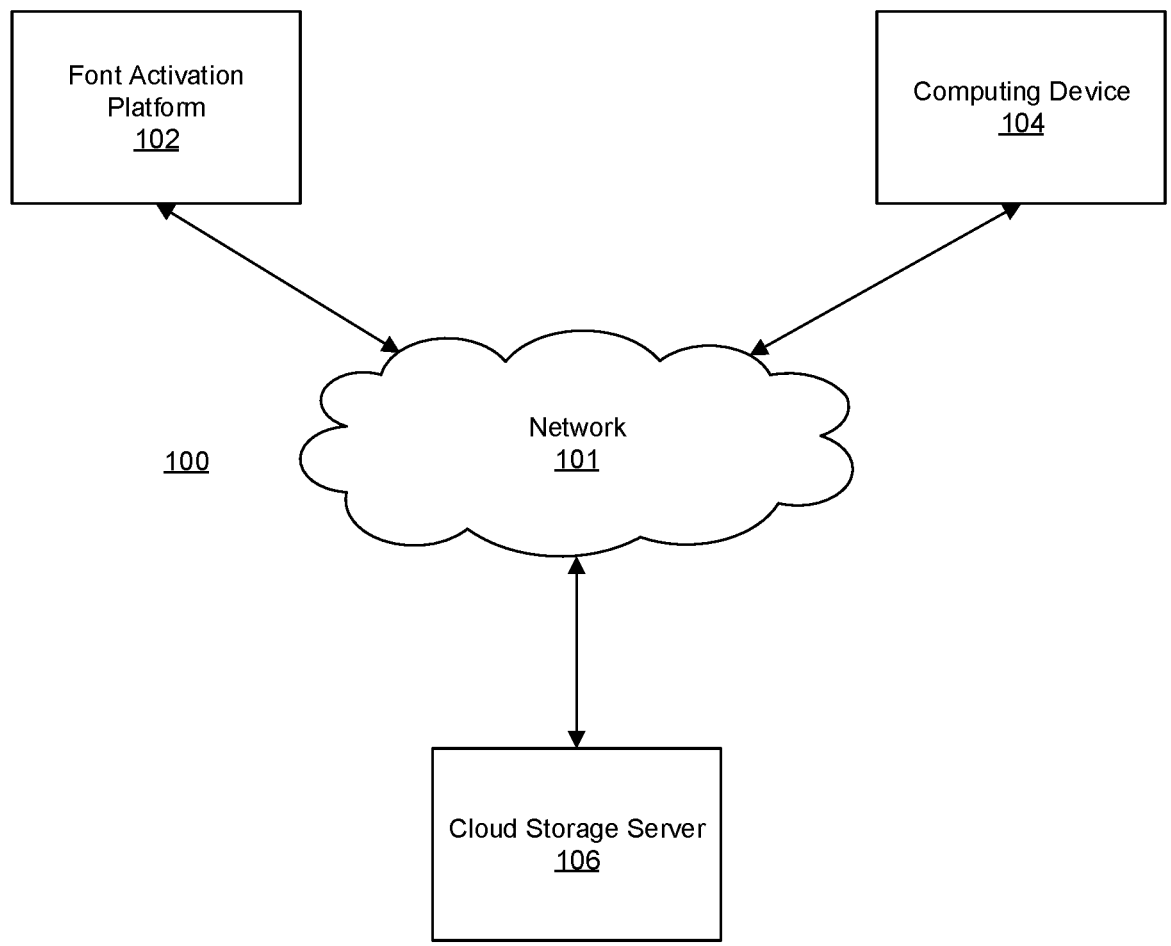
FIGS. 1A-1D depict an illustrative computing environment for font auto-activation in accordance with one or more example arrangements.

In the following description of various illustrative arrangements, reference is made to the accompanying drawings, which form a part hereof, and in which is shown, by way of illustration, various arrangements in which aspects of the disclosure may be practiced. In some instances, other arrangements may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief description of the concepts described further herein, to solve the limitations and technical problems associated with font auto-activation described above, some aspects of the disclosure relate to a system for performing font auto-activation (e.g., without the need for a unique plugin). Traditional font auto-activation techniques require custom software to intercept and respond to document-open requests initiated by a host application. Once a request is intercepted, a plugin unique to the host application initiating the request is used to activate fonts used or referenced by one or more text elements in the document. Overall, this system of activating fonts is outdated and inefficient, because these plugin SDKs are unique to an individual host application. Therefore, a user may require a unique plugin, developed against the plugin SDK, for each individual host application the user implements to open documents. There exists a strong need to move away from this host application-by-host application approach. Developing a unique plugin against the plugin SDK for each individual host application on a user's system requires time and resources. Additionally, when too many plugins are installed on a single system they may become difficult to manage. For example, depending on how a plugin is developed, it may become incompatible with a computing platform on which the user is running the plugin after making an update to the computing platform and/or the plugin. Accordingly, a method may be provided where font auto-activation can be achieved for any host application without the need for a plugin developed against the plugin SDK.

In these instances, the system may include a computing platform configured to handle requests (e.g., to retrieve a target asset) from a user device that require font auto-activation (e.g., document-open requests, document-edit requests, and/or other requests). In handling the requests, the computing platform may retrieve a target asset from a central database and extract information of the fonts included in and/or referenced by the target asset. The computing platform may store the information of the fonts until a request to access (e.g., open, edit, and/or otherwise access) the target asset is received, at which point the computing platform may automatically activate the corresponding stored fonts, bypassing the need for any plugin.

These and various other aspects will be discussed more fully herein.

FIGS. 1A-1D depicts an illustrative computing environment for font auto-activation in accordance with one or more example arrangements. Referring to FIG. 1A, computing environment 100 may include one or more computer systems. For example, computing environment 100 may include a font activation platform 102, a computing device 104, and a cloud storage server 106.

As described further below, font activation platform 102 may include one or more program modules (e.g., instructions, data, information, applications, and/or other program modules) and hardware components. Font activation platform 102 may be and/or include one or more computing devices (e.g., servers, server blades, or the like) and/or other computer components (e.g., processors, memories, communication interfaces) that may be used to extract fonts from a target asset and automatically activate the fonts based on or in response to receiving a request to access the target asset. In some instances, font activation platform 102 may be controlled or otherwise maintained by an enterprise organization (e.g., a digital asset management organization, and/or other organizations). Although shown as an independent computing platform, in some instances, the font activation platform 102 may be part of and/or otherwise integrated into the computing device 104 without departing from the scope of the disclosure. For example, font activation platform 102 may be one or more program modules (e.g., instructions, data, information, applications, and/or other program modules) and/or hardware implemented by computing device 104 to perform font auto-activation processes, as described herein. Additionally or alternatively, in some instances, the font activation platform 102 may be part of and/or otherwise integrated into a remote computing device associated with and/or managed by the enterprise organization (e.g., a digital asset management organization providing font activation services, and/or other organizations).

Computing device 104 may be a computing device (e.g., laptop computer, desktop computer, mobile device, tablet, smartphone, server, server blade, and/or other device) and/or other data storing or computing component (e.g., processors, memories, communication interfaces, databases) that may be used to transfer data between devices and/or perform other user functions (e.g., requesting user input, sending commands, storing fonts, and/or other functions). In one or more instances, computing device 104 may correspond to a user (who may, e.g., be an employee or client of an enterprise organization, such as an asset management organization, and/or other organization). In one or more instances, the computing device 104 may be configured to communicate with one or more systems (e.g., font activation platform 102 and/or other systems) to perform a data transfer, request retrieval of a target asset, and/or to perform other functions. In some instances, the computing device 104 may be configured to display one or more graphical user interfaces (e.g., asset request interfaces, font notification interfaces, and/or other interfaces).

Cloud storage server 106 may be and/or otherwise include one or more computing devices (e.g., servers, server blades, and/or other devices) and/or other computer components (e.g., processors, memories, communication interfaces) that may be configured to create, host, modify, and/or otherwise validate a cloud-based storage server (e.g., a distributed ledger). The cloud storage server 106 may be synchronized across multiple nodes (e.g., sites, institutions, geographical locations, and/or other nodes) and may be accessible by multiple users (who may, e.g., be employees or clients of an asset management organization). The data stored at the databases of cloud storage server 106 may include one or more assets (e.g., text documents, HTML documents, PDF documents, and/or other assets). In some instances, the databases stored on cloud storage server 106 may be accessed by, validated by, and/or modified by any of, computing device 104, font activation platform 102, and/or other devices.

Computing environment 100 also may include one or more networks, which may interconnect font activation platform 102, computing device 104, and cloud storage server 106. For example, computing environment 100 may include a network 101 (which may interconnect, e.g., font activation platform 102, computing device 104, and cloud storage server 106).

In one or more arrangements, font activation platform 102, computing device 104, and cloud storage server 106 may be any type of computing device capable of sending and/or receiving requests and processing the requests accordingly. For example, font activation platform 102, computing device 104, and cloud storage server 106, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of font activation platform 102, computing device 104, and cloud storage server 106, may, in some instances, be special-purpose computing devices configured to perform specific functions.

Figure 1B:
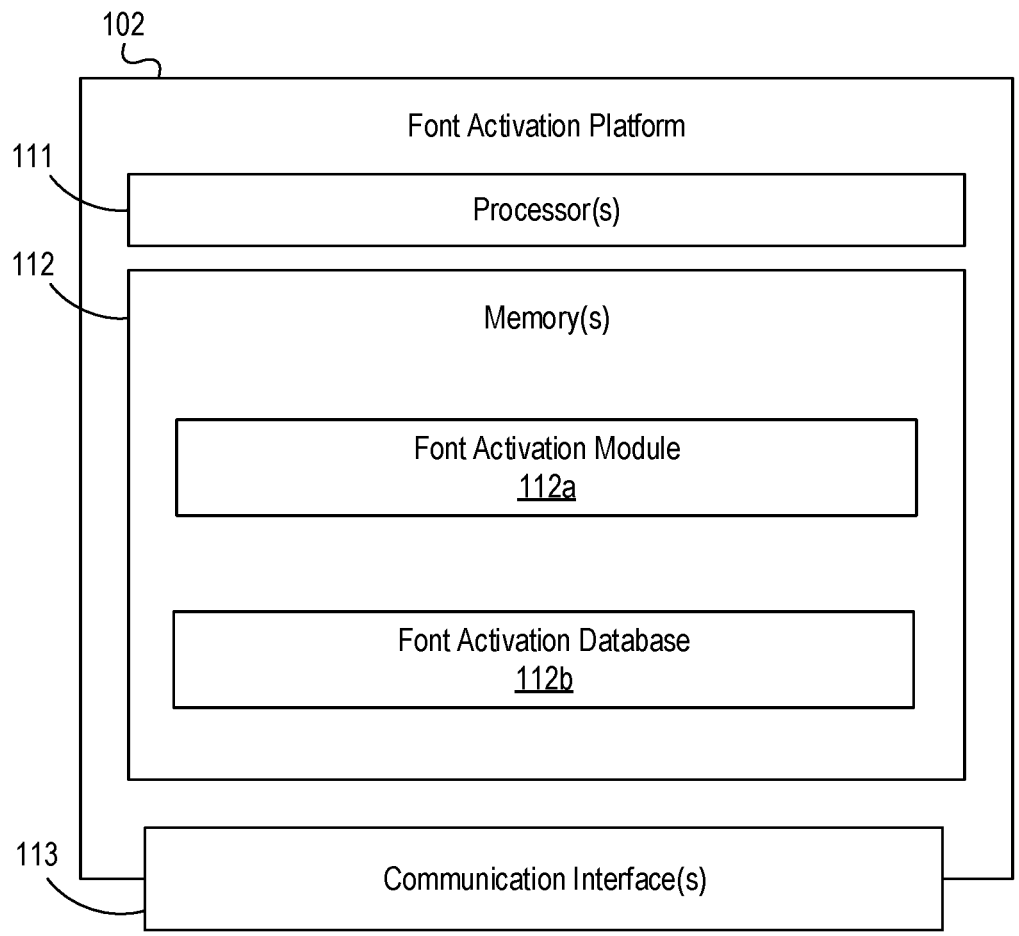
Figure 1C:
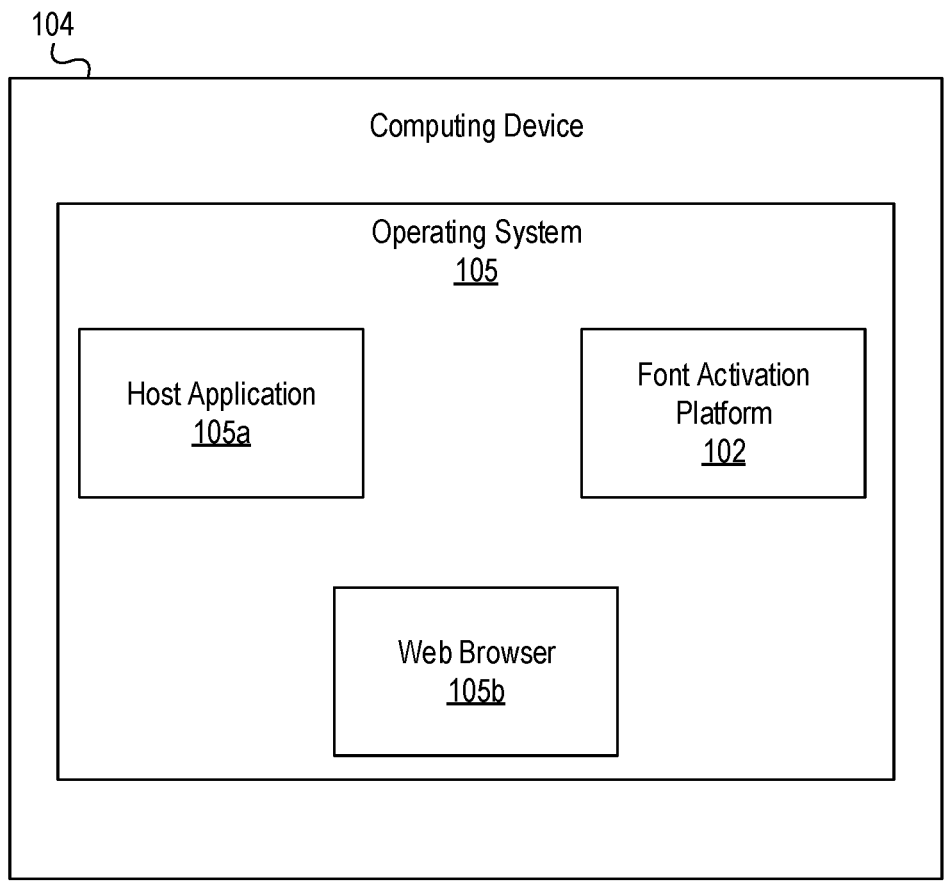
Figure 1D:
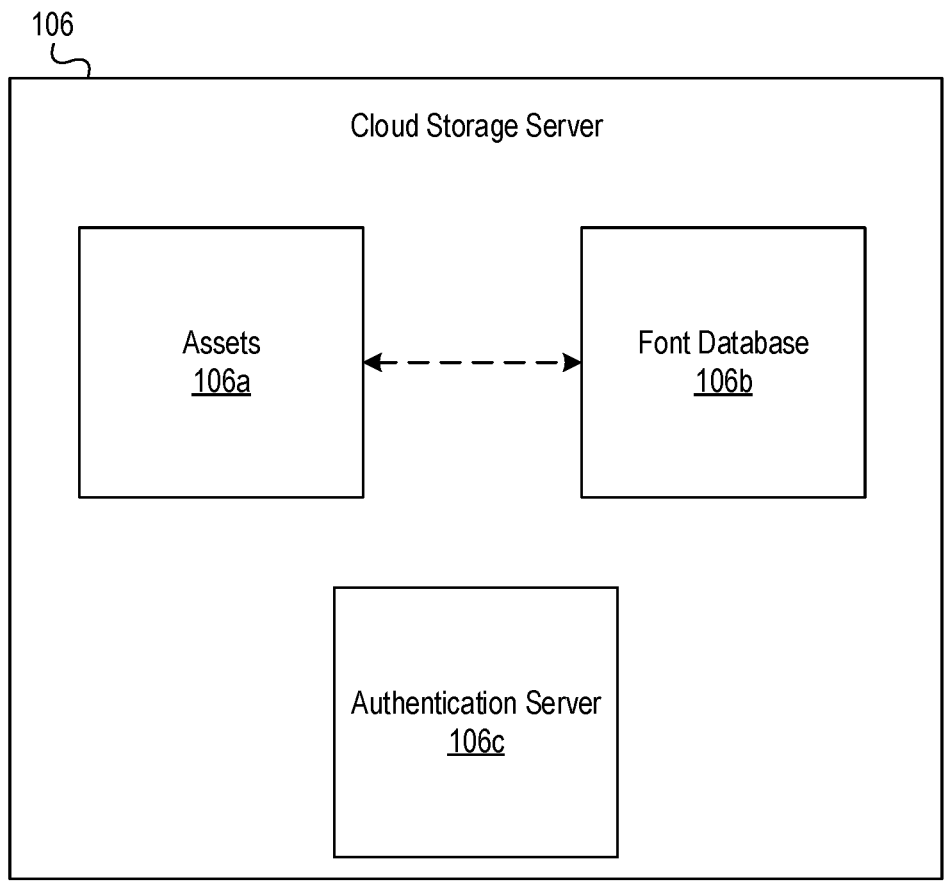

FIGS. 1B-1D depict further details of the illustrative computing environment for font auto-activation depicted in FIG. 1A, in accordance with one or more example arrangements. Referring to FIG. 1B, font activation platform 102 may include one or more processors 111, memory 112, and communication interface 113. A data bus may interconnect processor 111, memory 112, and communication interface 113. Communication interface 113 may be a network interface configured to support communication between font activation platform 102 and one or more networks (e.g., network 101, or the like). Communication interface 113 may be communicatively coupled to the processor 111. Memory 112 may include one or more program modules having instructions that, when executed by processor 111, cause font activation platform 102 to perform one or more functions described herein and/or one or more databases that may store and/or otherwise maintain information which may be used by such program modules and/or processor 111. In some instances, the one or more program modules and/or databases may be stored by and/or maintained in different memory units of font activation platform 102 and/or by different computing devices that may form and/or otherwise make up font activation platform 102. For example, memory 112 may have, host, store, and/or include font activation module 112a and font activation database 112b.

Font activation module 112a may have instructions that direct and/or cause font activation platform 102 to automatically activate one or more fonts based on a request to access a target asset (e.g., text documents, HTML documents, PDF documents, or the like). Font activation database 112b may have instructions causing font activation platform 102 to store one or more fonts extracted from the target asset.

Referring to FIG. 1C, computing device 104 may include an operating system 105 supporting basic functions of computing device 104 (e.g., supporting program modules (such as font activation platform 102, and/or other program modules), communicating with one or more networks (e.g., network 101, or the like), and/or other functions). Operating system 105 may host, execute, and/or otherwise operate one or more computer program modules (e.g., applications, instructions, or the like) that perform specific functions. For example, the operating system 105 may operate one or more of host application 105a, web browser 105b, and font activation platform 102. Host application 105a may be and/or include one or more computer program modules configured to perform operations on digital assets. For example, host application 105a may be configured to open, edit, and/or otherwise perform operations on one or more text documents, HTML documents, PDF documents, and/or other digital assets. Web browser 105b may be and/or include one or more computer program modules configured to request access to a website from a web server connected to the internet, browse a digital asset manager service, and/or other functions. In some instances, web browser 105b may be configured to operate based on or in response to user input. For example, a user may provide user input to computing device 104 directing web browser 105b to request access to a particular website, browse a digital asset manager service, and/or perform other functions. In some instances, font activation platform 102 may be and/or include one or more program modules installed on computing device 104 and implemented by operating system 105. Accordingly, in some examples, the components described above in FIG. 1B may be incorporated in and/or otherwise included in computing device 104. For example, the one or more processors 111, memory 112, and communication interface 113 referred to in FIG. 1B may be incorporated in and/or otherwise included in computing device 104. In some instances, font activation platform 102 may be and/or include one or more program modules executed by a computing device different from computing device 104. In these instances, operating system 105 may access font activation platform 102 via computing device 104. For example, operating system 105 may access font activation platform 102 by communicating with the communication interface 113 and while a wireless data connection is established.

Referring to FIG. 1D, cloud storage server 106 may be and/or include a digital asset management system which may, e.g., provide font activation services. Cloud storage server 106 may include one or more assets 106a, a font database 106b, and an authentication server 106c. Assets 106a may be and/or include one or more digital assets (e.g., text documents, HTML documents, PDF documents, and/or other digital assets) stored across one or more nodes of cloud storage server 106. Font database 106b may be and/or include one or more digital data files containing a set of graphically related glyphs comprising a font (e.g., letters of an alphabet, symbols, characters, and/or other glyphs). Each font included in font database 106b may be stored with and/or in a corresponding digital asset included in assets 106a. For example, a text document included in assets 106a may contain metadata information indicating the text document includes three particular fonts. Based on the metadata information, cloud storage server 106 may store the digital data files representing each of the three particular fonts in the same node as the text document and include indicators in each of the three particular fonts associating the fonts with the text document. Authentication server 106c may be and/or include hardware and/or software configured to manage access to a network, application, and/or system (e.g., cloud storage server 106, or the like). For example, authentication server 106c may be associated with an enterprise organization (e.g., a digital asset management organization, such as a provider of font activation services, and/or other organizations) and configured to prevent access to cloud storage server 106 until a user requesting access provides credential information (e.g., a username, password, security code, and/or other credential information).

Figure 2A:
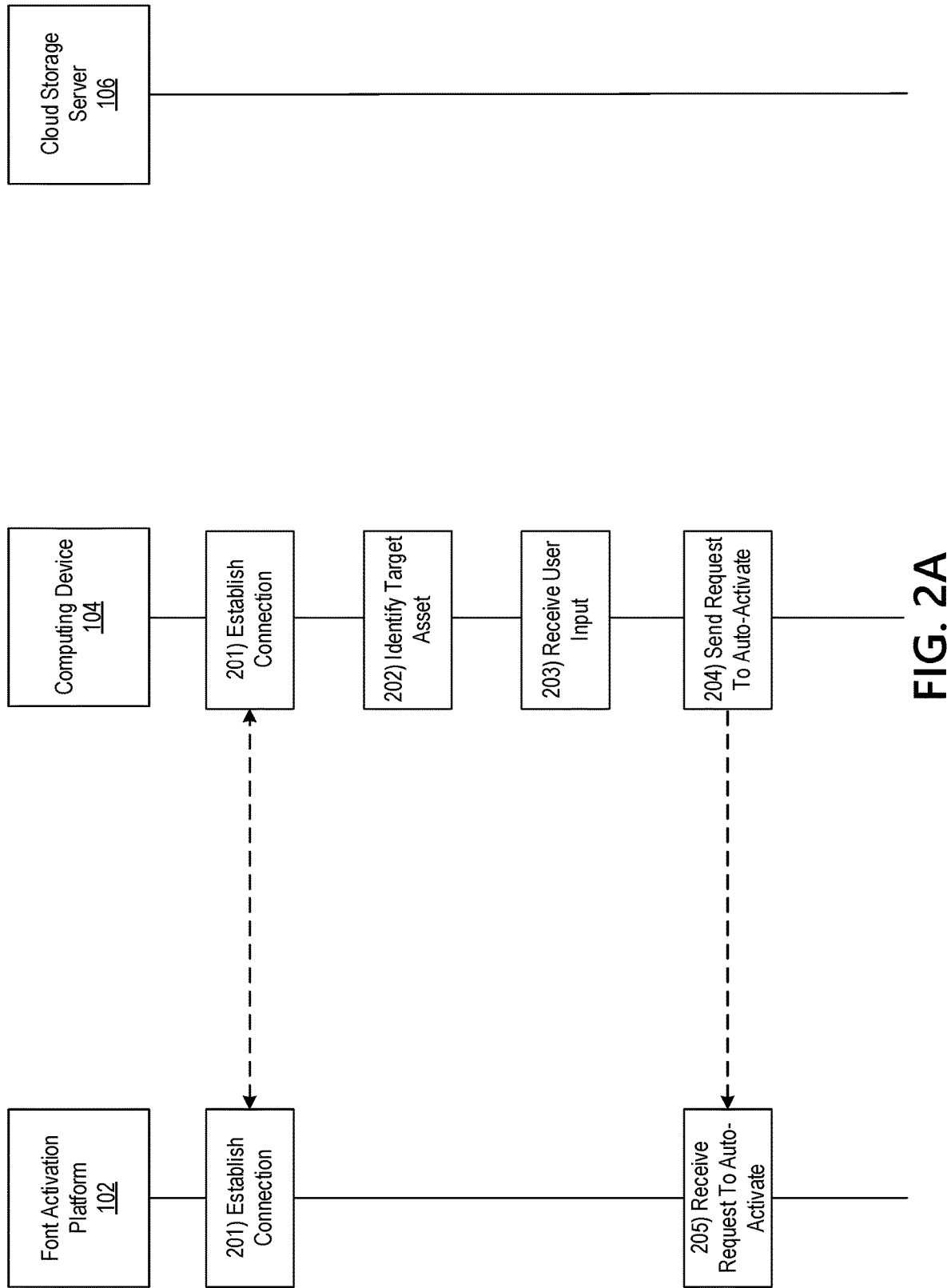

FIGS. 2A-2D depict an illustrative event sequence for font auto-activation in accordance with one or more example arrangements. Referring to FIG. 2A, at step 201, the font activation platform 102 may establish a connection with computing device 104. For example, font activation platform 102 may establish a first wireless data connection with the computing device 104 to link the computing device 104 with the font activation platform 102 (e.g., in preparation for receiving font auto-activation commands, and/or other functions). In some instances, the font activation platform 102 may identify whether or not a connection is already established with the computing device 104. If a connection is already established with the computing device 104, the font activation platform 102 might not re-establish the connection. If a connection is not yet established with the computing device 104, the font activation platform 102 may establish the first wireless data connection as described above.

At step 202, computing device 104 may identify a target asset (e.g., a digital asset such as text documents, HTML documents, PDF documents, and/or other assets). In identifying the target asset, computing device 104 may receive user input from a user associated with computing device 104. The user may be a client or an employee of an enterprise organization (e.g., a digital asset management organization providing digital asset management services, or the like). The user input may direct computing device 104 to identify the target asset by searching for the target asset on an external server (e.g., cloud storage server 106, and/or other servers). In some examples, the user input may direct the web browser 105*b* to identify a target asset of the one or more assets 106*a* stored on cloud storage server 106. For instance, based on or in response to user input directing the computing device 104 to identify the target asset (e.g., keyboard inputs indicating a file name corresponding to the target asset, a computer mouse input selecting the target asset from a list of available assets, and/or other user input) the web browser 105*b* may locate the storage location of the target asset on the external server (e.g., cloud storage server 106, and/or other external servers). In some examples, the web browser 105*b* may wait until additional user input is received by computing device 104 to retrieve the target asset from the external server (e.g., as described below at step 203).

At step 203, based on or in response to identifying the target asset, the computing device 104 may receive user input requesting access to the target asset. In some instances, the computing device 104 may receive user input different from and/or additional to the user input described above at step 202. For example, based on or in response to providing user input to identify the target asset, the user may provide additional user input requesting access to the target asset. The user input may include one or more of computer mouse clicks, keyboard commands, user input selecting a menu option, user input directing the computing platform to edit a target asset, and/or other inputs. For example, the user input may be and/or include a mouse click from the user directing the computing device 104 to access the target asset (e.g., a document-open request corresponding to the target asset, an edit request corresponding to the target asset, and/or other means of accessing the target asset) from cloud storage server 106.

In some instances, in receiving the user input, the computing device 104 may receive the user input via a user interface displayed by the computing device 104. For example, the computing device 104 may receive the user input via display of an asset request interface. The asset request interface displayed by the computing device 104 may display information that will be included in one or more requests sent to the font activation platform 102 (e.g., as described below at step 204).

Figure 3A:
FIGS. 3A-3B depict illustrative graphical user interfaces associated with font auto-activation in accordance with one or more example arrangements.

For instance, in displaying the asset request interface, the computing device 104 may display a graphical user interface similar to asset request interface 300, which is illustrated in FIG. 3A. Referring to FIG. 3A, in some instances, the asset request interface 300 may include information corresponding to an asset for which the user of the computing device 104 indicated (e.g., via additional user input) one or more requests should be sent to the font activation platform 102. For example, the asset request interface 300 may include information such as an identification of the user, an identification of the asset to be requested, an identification of the device (e.g., computing device 104, or the like) from which the access request will originate, and/or other information. The asset request interface 300 may also display interface elements or selectable options requesting user input. For example, the asset request interface 300 may display one or more of: an information entry field, a button or buttons, toggle or toggles, check box or boxes, a fingerprint scanner, a retina scanner/camera, and/or other interface elements. For example, as illustrated in FIG. 3A, the interface elements may be one or more buttons the user might toggle to confirm or deny a request to access a targeted asset. In some instances, based on user input confirming or denying the request, the computing device 104 may identify the requested asset indicated by the asset request interface 300 as the target asset.

Referring back to FIG. 2A, at step 204, based on or in response to receiving the user input to requesting access to the target asset, the computing device 104 may send one or more requests to the font activation platform 102 directing the font activation platform 102 to perform font auto-activation. For example, the computing device 104 may send the one or more requests using the communication interface 113 and while the first wireless data connection is established. Additionally or alternatively, the computing device 104 may instruct operating system 105 to cause font activation platform 102 to receive the one or more requests. In some instances, the one or more requests directing the font activation platform 102 to perform font auto-activation may additionally cause the font activation platform 102 to retrieve the target asset from the external source (e.g., cloud storage server 106, and/or other external sources), as described below at steps 306-307.

At step 205, the font activation platform 102 may receive the one or more requests from computing device 104. For example, the font activation platform 102 may receive the one or more requests via the communication interface 113 and while the first wireless data connection is established. Additionally or alternatively, the font activation platform 102 may receive the one or more requests via the operating system 105. For example, the operating system 105 may provide instructions directing the font activation platform 102 to perform font auto-activation on the target asset.

Figure 2B:
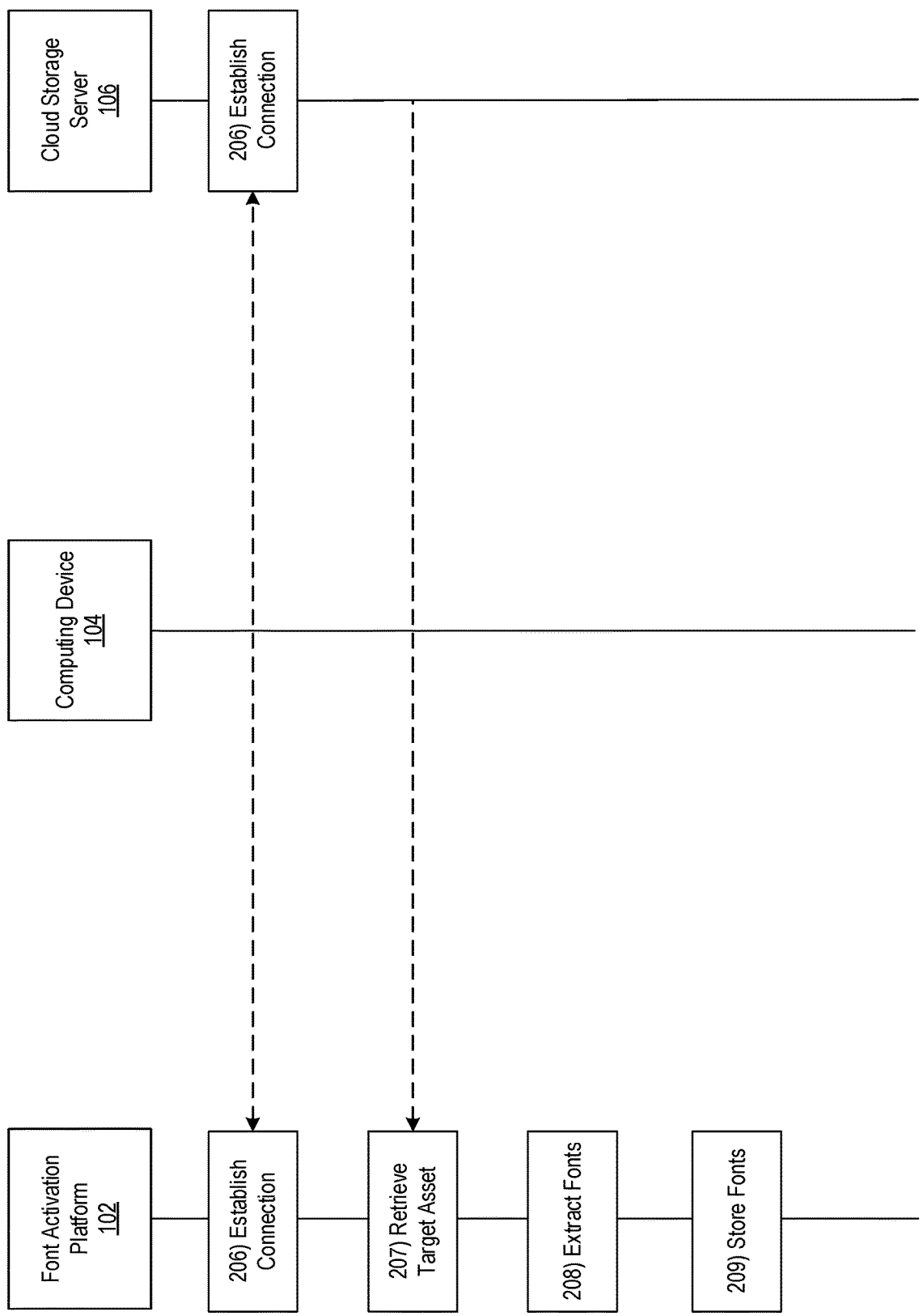

Referring to FIG. 2B, at step 206, the font activation platform 102 may establish a connection with cloud storage server 106. For example, font activation platform 102 may establish a second wireless data connection with the cloud storage server 106 to link the cloud storage server 106 with the font activation platform 102 (e.g., in preparation for retrieving target assets, and/or other functions). In some instances, the font activation platform 102 may identify whether or not a connection is already established with the cloud storage server 106. If a connection is already established with the cloud storage server 106, the font activation platform 102 might not re-establish the connection. If a connection is not yet established with the cloud storage server 106, the font activation platform 102 may establish the second wireless data connection as described above.

At step 207, the font activation platform 102 may retrieve the target asset from the cloud storage server 106. For example, the font activation platform 102 may retrieve the target asset via the communication interface 113 and while the second wireless data connection is established. In retrieving the target asset, the font activation platform 102 may first authenticate computing device 104 with the cloud storage server 106. For example, the font activation platform 102 may provide credential information corresponding to the user of computing device 104 to the authentication server 106*c*. The font activation platform 102 may provide one or more usernames, passwords, security codes, and/or other credential information. In providing the credential information, font activation platform 102 may authenticate that computing device 104 is associated with a client or employee of the organization managing cloud storage server 106 (e.g., a digital asset management organization, and/or other organizations).

Additionally or alternatively, in retrieving the target asset, the font activation platform 102 may send a request to cloud storage server 106 requesting a download of the target asset. Based on or in response to the request for download of the target asset, the cloud storage server 106 may provide the font activation platform 102 with the target asset (e.g., via a download). For example, the cloud storage server 106 may send the requested target asset, such as a portable document (e.g., a document in portable document format (PDF) and/or other portable documents) to the font activation platform 102. The target asset may be one of assets 106a stored on cloud storage server 106. In some examples, in providing the target asset, the cloud storage server 106 may additionally provide one or more fonts included in the font database 106b stored on cloud storage server 106. In these instances, the one or more fonts may be associated with the target asset. For instance, the cloud storage server 106 may send the requested target asset, such as a text-editable document or the like, to font activation platform 102 and may additionally send the one or more fonts associated with the text-editable document. For example, the text-editable document may comprise three paragraphs, where each paragraph is written in a different font. Accordingly, in these examples, in sending the target asset (e.g., the text-editable document, or the like) to the font activation platform 102, the cloud storage server 106 may also send the digital data files associated with the fonts used in the target asset (e.g., the font used in each paragraph of the text-editable document).

At step 208, based on or in response to receiving the target asset, the font activation platform 102 may extract one or more fonts from the target asset. For example, the font activation platform 102 may extract information from the target asset specifying one or more fonts included in the target asset. In extracting the one or more fonts, font activation platform 102 may examine, mine, and/or otherwise analyze the target asset to identify the one or more digital data files corresponding to fonts included in the target asset. For example, the font activation platform 102 may use the target asset's metadata to identify the digital data files included in and/or linked to the target asset's metadata. The digital data files may each contain a set of graphically related glyphs comprising a font (e.g., letters of an alphabet, symbols, characters, and/or other glyphs).

At step 209, the font activation platform 102 may store the one or more fonts extracted from the target asset to a staging location. The staging location may be a storage location such as a database, memory, repository, and/or other storage locations accessible by both the computing device 104 and the font activation platform 102 (e.g., for performing font auto-activation). For example, the staging location may be internal memory of the computing device 104, external memory of a second computing device associated with the font activation platform 102 (e.g., a computing device associated with an employee of an enterprise organization, such as a digital asset management organization, or the like), a cloud-based storage system different from cloud storage server 106, and/or other storage locations. In storing the one or more fonts to the staging location, the font activation platform 102 may store the one or more fonts to a storage location that allows the font activation platform to access the one or more fonts more efficiently (e.g., in a shorter period of time and/or with the use of less resources) than accessing the one or more fonts from cloud storage server 106.

Referring to FIG. 2C, at step 210, the font activation platform 102 may generate one or more font activation rules. In some instances, the font activation platform 102 may generate the one or more font activation rules associated with the target asset based on receiving a request to access the target asset. In some examples, the request to access the target asset may be the request previously received from the computing device 104 (e.g., as described above at step 205). Additionally or alternatively, in some instances, the request to access the target asset may be a subsequent request from the computing device 104. For example, computing device 104 may send a request to access the target asset at the staging location based on user input directing the computing device 104 to request access to the target asset (e.g., for opening the target asset, editing the target asset, and/or other functions). In these instances, based on or in response to the request to access the target asset, the font activation platform 102 may generate the one or more font activation rules such that the rules automatically activate the one or more fonts prior to granting the computing device 104 access to the target asset. Additionally or alternatively, in some examples, the font activation platform 102 may generate the one or more font activation rules associated with the target asset automatically after storing the one or more fonts.

In generating the one or more font activation rules, the font activation platform 102 may generate an executable script. The executable script may be configured to, once executed by the font activation platform 102 (e.g., by processing the executable script using the one or more processors 111, and/or by other methods of executing a script) automatically activate the one or more fonts specified by the information extracted from the target asset. The executable script may further be configured to automatically activate the one or more fonts prior to opening the target asset (e.g., by executing a document-open request, executing a request to edit the target asset, and/or other means of opening the target asset). Activating the one or more fonts may be and/or include the process of installing the digital data files corresponding to each font on an operating system, such as operating system 105.

In some instances, the executable script may be configured to activate one or more fonts using one or more font activation types. For instance, the executable script may be configured to activate one or more fonts using temporary global font activation. For example, the executable script may be configured to install one or more fonts such that the one or more fonts are available to all applications on computing device 104 during a single log-in session associated with operating system 105. In these examples, when the user of computing device 104 logs out of the log-in session, the operating system 105 may deactivate (e.g., uninstall, remove, and/or otherwise deactivate) the one or more fonts. Additionally or alternatively, in some instances, the executable script may be configured to activate one or more fonts using temporary private font activation. For example, the executable script may be configured to install one or more fonts such that the one or more fonts are available only to a specific application running on the operating system 105. For instance, if the operating system 105 is currently managing a word processor application, the executable script may be configured to install the one or more fonts such that the one or more fonts are available only to the word processor application. Accordingly, the font activation platform 102 may conserve the resources of computing device 104 by limiting the number of applications with access to the one or more fonts. In these examples, when the user of computing device 104 logs out of the log-in session, the operating system 105 may deactivate (e.g., uninstall, remove, and/or otherwise deactivate) the one or more fonts. Additionally or alternatively, in some instances, the executable script may be configured to activate one or more fonts using permanent font activation. For example, the executable script may be configured to install the one or more fonts such that the one or more fonts are available to one or more applications managed by operating system 105 in future log-in sessions. In these examples, the one or more fonts may be permanently installed on the operating system 105.

In some instances, the font activation platform 102 may generate an executable script configured to install fonts using one or more of temporary global font activation, temporary private font activation, an/or permanent font activation for different fonts of the one or more fonts. For example, the target asset may be a PDF document which includes three different fonts. In this example, in generating the one or more font activation rules, the font activation platform 102 may generate an executable script configured to install a first font using temporary global font activation, install a second font using temporary private font activation, and install a third font using permanent font activation. In some examples, the font activation platform 102 may generate the one or more font activation rules based on user preferences. For example, the user of computing device 104 may have previously instructed font activation platform 102 to generate executable scripts configured to install fonts using one or more of temporary global font activation, temporary private font activation, an/or permanent font activation for different fonts of the one or more fonts based on a variety of parameters (e.g., the font, a host application the font will be available to, a user profile corresponding to a particular user of computing device 104, a set of company policies associated with font activation, and/or other parameters).

In generating the one or more font activation rules, the font activation platform 102 may further associate the one or more font activation rules with the target asset (e.g., by storing a correlation between the one or more font activation rules and the target asset in internal memory, external memory, and/or other memory).

At step 211, the font activation platform 102 may cause automatic activation of the one or more fonts. For example, the font activation platform 102 may execute the one or more font activation rules generated at step 210. In some instances, in executing the one or more font activation rules, the font activation platform 102 may send one or more commands to the computing device 104 directing the operating system 105 to execute the one or more font activation rules. For example, the font activation platform 102 may send one or more commands directing the operating system 105 to install the one or more fonts in accordance with the one or more font activation rules. In some examples, the one or more commands may additionally direct the operating system 105 to provide access to the target asset (e.g. by opening the target asset, displaying the target asset, and/or otherwise providing access) after activating the one or more fonts. For example, the one or more commands may direct the operating system 105 to launch and/or otherwise initiate a host application (e.g., a file editor, word processor, and/or other application). In launching the host application and based on the one or more commands from the font activation platform 102, the operating system 105 may cause the host application to apply the activated one or more fonts to the text layers of the target asset corresponding to the one or more fonts. Accordingly, the operating system 105 may provide the user of computing device 104 with access to the target asset with the corresponding one or more fonts already activated, eliminating the need for a plugin.

At step 212, the font activation platform 102 may cause a notification indicating that the one or more fonts have been activated. For example, the font activation platform 102 may notify the user associated with computing device 104, by sending a notification to the computing device 104. In some instances, in causing the notification, the 102 may additionally transmit and cause display of a user interface at the computing device 104. For example, the font activation platform 102 may transmit and cause display of a font notification interface. In transmitting and causing display of the font activation interface, the font activation platform 102 may send one or more display commands directing the computing device 104 to display a user interface. Based on or in response to the one or more display commands, the computing device 104 may display the font activation interface.

Figure 3B:
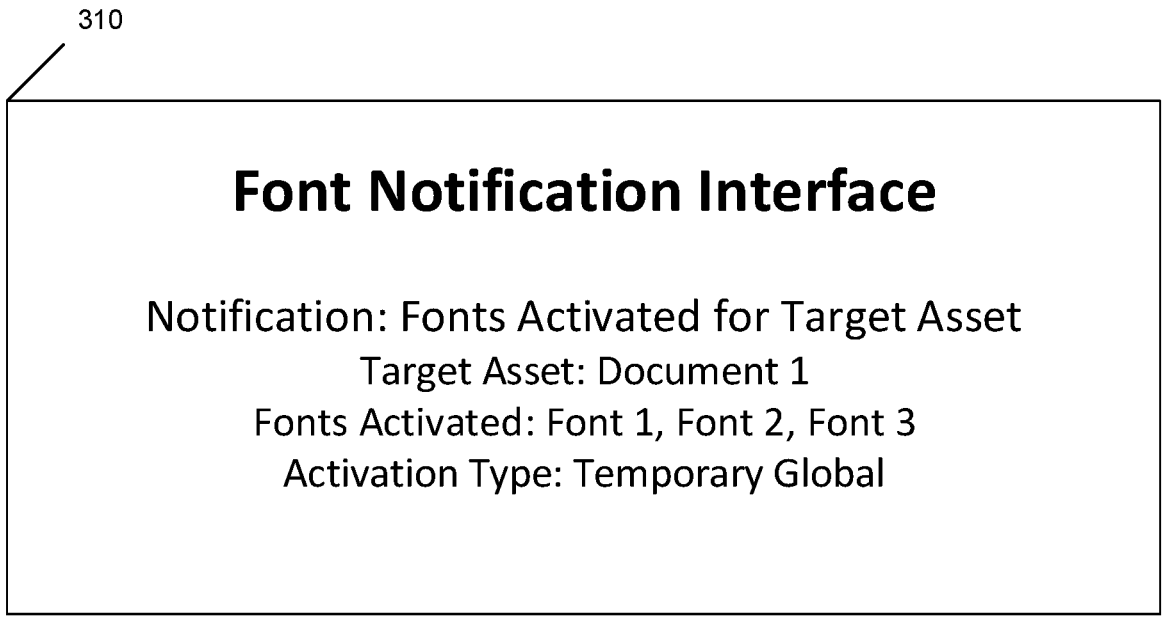

For instance, in displaying the font activation interface, the computing device 104 may display a graphical user interface similar to font activation interface 310, which is illustrated in FIG. 3B. Referring to FIG. 3B, in some instances, the font activation interface 310 may include information corresponding to the one or more fonts activated by the font activation platform 102. For example, the font activation interface 310 may include information such as a notification that one or more fonts have been activated for the target asset, an indication of the target asset, an indication of which font types were activated for the target asset, an activation type associated with the one or more fonts (e.g., temporary global font activation, temporary private font activation, permanent font activation, or the like), and/or other information.

At step 213, the font activation platform 102 may terminate access to the target asset. In some instances, after causing automatic activation of the one or more fonts and after an elapsed period of time, the font activation platform 102 may receive a request and/or notification from computing device 104 for terminating access to the target asset. For example, the user of computing device 104 may complete a task using the target asset and provide user input indicating access to the target asset should be terminated (e.g., performing a document-close action, and/or other means of terminating access). In these instances, based on or in response to the computing device 104 terminating access to the target asset, the font activation platform 102 may deactivate all or a subset of the one or more fonts. For example, a first font of the one or more fonts may have been activated using temporary global font activation. Accordingly, if the user of computing device 104 logs out of the log-in session (which may, e.g., terminate access to the target asset) the font activation platform 102 may deactivate the first font by causing the operating system 105 to uninstall the first font.

Referring to FIG. 2D, at step 214, the font activation platform 102 may identify one or more font changes corresponding to the target asset. In identifying the one or more font changes, the font activation platform 102 may continuously or near-continuously monitor the target asset. For example, the font activation platform 102 may monitor the target asset for changes made by a user, such as the user of computing device 104 and/or other users, to identify changes to the fonts used or referenced by the target asset (e.g., the addition of a new font and/or the removal of an existing font). Additionally or alternatively, in some examples, the font activation platform 102 may monitor the target asset at cloud storage server 106, (e.g., via the communication interface 113 and while the second wireless data connection is established). For instance, the font activation platform 102 may continuously or near-continuously gather information of one or more font changes made by one or more additional users (e.g., additional clients and/or employees of an organization, such as a digital asset management organization, and/or other organizations) associated with cloud storage server 106.

At step 215, based on or in response to identifying the one or more font changes at step 214, the font activation platform 102 may update the font activation rules generated at step 210. In updating the font activation rules, font activation platform 102 may add one or more new rules based on one or more new fonts identified at step 214 and corresponding to the target asset. For example, the font activation platform 102 may have previously identified that two new fonts were added to the target asset by the user of computing device 104 after font activation platform 102 automatically activated the fonts (e.g., as described above at step 211), and may generate a new executable script including font activation rules corresponding to the two new fonts. Additionally or alternatively, in updating the font activation rules, font activation platform 102 may remove one or more existing rules based on the one or more font changes. For example, the font activation platform 102 may have previously identified that the user of computing device 104 removed a font from the target asset after font activation platform 102 automatically activated the fonts (e.g., as described above at step 211). Accordingly, the font activation platform 102 may delete and/or otherwise remove existing font activation rules corresponding to the removed font.

Figure 4:
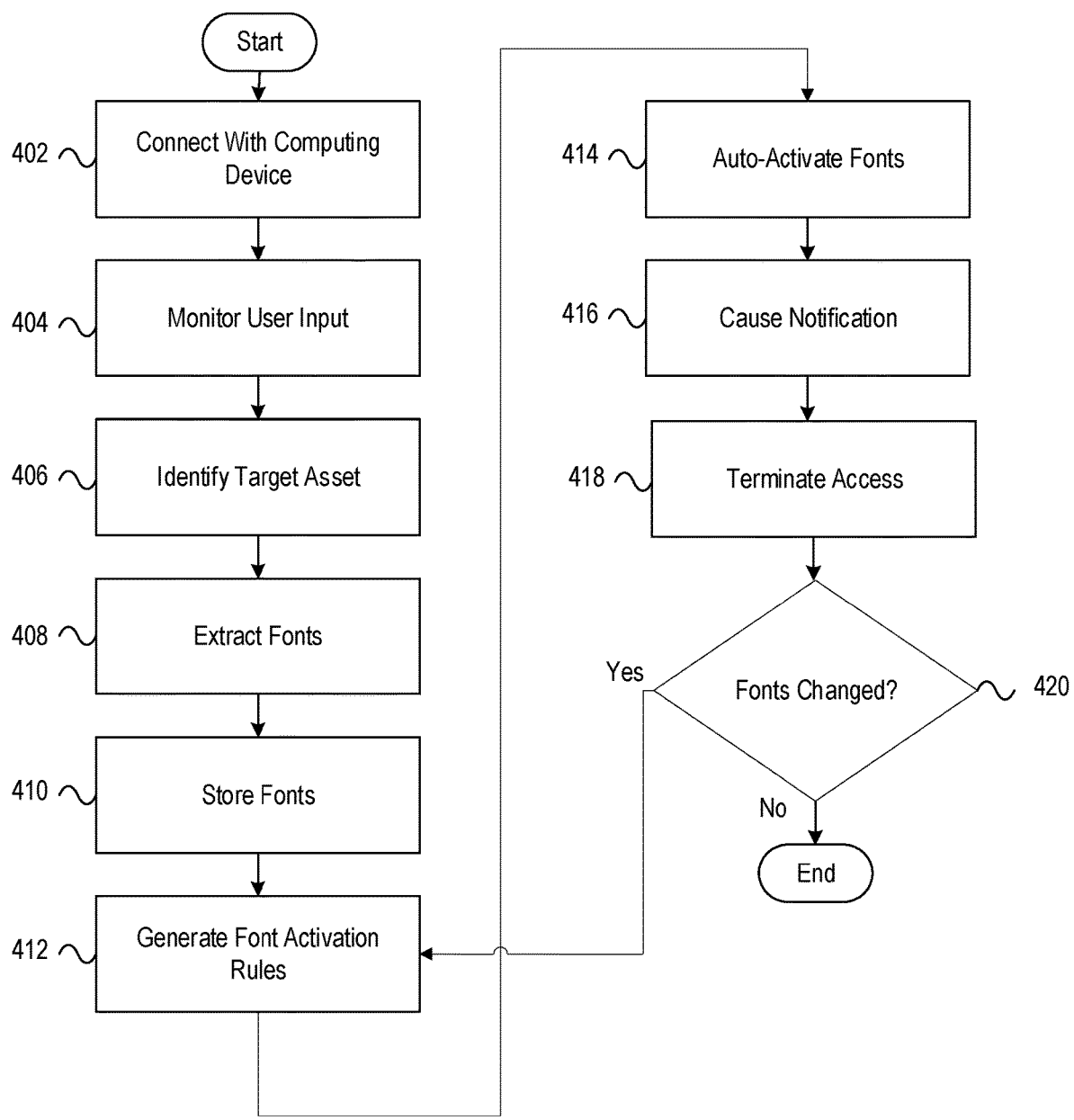
FIG. 4 depicts an illustrative method for font auto-activation in accordance with one or more example arrangements.

FIG. 4 depicts an illustrative method for font auto-activation in accordance with one or more example arrangements. Referring to FIG. 4, at step 402, a computing platform having at least one processor, a communication interface, and memory may connect with a computing device. At step 404, the computing platform may monitor user input. At step 406, the computing platform may identify a target asset for retrieval based on the monitored user input. For instance, user input identifying the target asset may be received. At step 408, the computing platform may extract one or more fonts from the target asset. At step 410, the computing platform may store the one or more fonts.

At step 412, the computing platform may generate one or more font activation rules. At step 414, the computing platform may auto-activate the one or more fonts based on the one or more font activation rules. At step 416, the computing platform may cause notification that the one or more fonts have been activated. At step 418, the computing platform may terminate access to the target asset. At step 420, the computing platform may identify whether or not one or more of the fonts has changed. Based on identifying that one or more of the fonts has changed, the computing platform may proceed to step 412 and generate one or more font activation rules based on the one or more changed fonts.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various arrangements. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative arrangements, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative arrangements thereof. Numerous other arrangements, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   receive, from a computing device, one or more requests to retrieve a target asset;
   responsive to receiving the one or more requests, retrieve, from a cloud storage server, the target asset;
   extract, from the target asset, information specifying one or more fonts included in the target asset;
   store the one or more fonts to a staging location;
   generate, based on the one or more fonts, one or more font activation rules;

activate, based on the one or more font activation rules, the one or more fonts; and send, after the activating, one or more commands directing the computing device to access the target asset corresponding to the activated one or more fonts.

2. The computing platform of claim 1, wherein the memory stores one or more additional computer-readable instructions that, when executed by the at least one processor, cause the computing platform to:

monitor the target asset, wherein monitoring the target asset comprises identifying font changes within the target asset; and update, based on identifying the font changes within the target asset, the one or more font activation rules.

3. The computing platform of claim 1, wherein the memory stores one or more additional computer-readable instructions that, when executed by the at least one processor, cause the computing platform to:

deactivate, based on receiving a request to terminate access to the target asset, the one or more fonts.

4. The computing platform of claim 1, wherein the one or more requests to retrieve the target asset comprise one or more of: mouse clicks, keyboard commands, user input selecting a menu option, or user input directing the computing platform to edit the target asset.

5. The computing platform of claim 1, wherein the target asset comprises one or more of: a hypertext markup language (HTML) document, a text document, or a portable document.

6. The computing platform of claim 1, wherein the one or more font activation rules comprise an executable script, wherein the executable script is configured to automatically activate the one or more fonts specified by the information extracted from the target asset, prior to opening the target asset, based on the computing platform executing the executable script.

7. The computing platform of claim 1, wherein the computing platform is managed by a remote computing device associated with a provider of font activation services.

8. The computing platform of claim 1, wherein the staging location comprises one or more of: internal memory of the computing device, external memory of a second computing device associated with the computing platform, or a cloud-based storage system.

9. The computing platform of claim 1, wherein the one or more font activation rules comprise one or more of:

a rule to activate one or more fonts using temporary global activation, a rule to activate one or more fonts using temporary private activation, or a rule to activate one or more fonts using permanent font activation.

10. A method comprising:

at a computing platform comprising at least one processor, a communication interface, and memory:

receiving, from a computing device, one or more requests to retrieve a target asset;

responsive to receiving the one or more requests, retrieving, from a cloud storage server, the target asset;

extracting, from the target asset, information specifying one or more fonts included in the target asset;

storing the one or more fonts to a staging location;

generating, based on the one or more fonts, one or more font activation rules;

activating, based on the one or more font activation rules, the one or more fonts; and sending, after the activating, one or more commands directing the computing device to access the target asset corresponding to the activated one or more fonts.

11. The method of claim 10, further comprising:

monitoring the target asset, wherein monitoring the target asset comprises identifying font changes within the target asset; and updating, based on identifying the font changes within the target asset, the one or more font activation rules.

12. The method of claim 10, further comprising deactivating, based on receiving a request to terminate access to the target asset, the one or more fonts.

13. The method of claim 10, wherein the target asset comprises one or more of: a hypertext markup language (HTML) document, a text document, or a portable document.

14. The method of claim 10, wherein the one or more font activation rules comprise an executable script, wherein the executable script is configured to automatically activate the one or more fonts specified by the information extracted from the target asset, prior to opening the target asset, based on the computing platform executing the executable script.

15. The method of claim 10, wherein the computing platform is managed by a remote computing device associated with a provider of font activation services.

16. The method of claim 10, wherein the staging location comprises one or more of: internal memory of the computing device, external memory of a second computing device associated with the computing platform, or a cloud-based storage system.

17. The method of claim 10, wherein the one or more font activation rules comprise one or more of:

a rule to activate one or more fonts using temporary global activation, a rule to activate one or more fonts using temporary private activation, or a rule to activate one or more fonts using permanent font activation.

18. One or more non-transitory computer-readable media storing instructions that, when executed by a computing platform comprising at least one processor, a communication interface, and memory, cause the computing platform to:

receive, from a computing device, one or more requests to retrieve a target asset;

responsive to receiving the one or more requests, retrieve, from a cloud storage server, the target asset;

extract, from the target asset, information specifying one or more fonts included in the target asset;

store the one or more fonts to a staging location;

generate, based on the one or more fonts, one or more font activation rules;

activate, based on the one or more font activation rules, the one or more fonts; and send, after the activating, one or more commands directing the computing device to access the target asset corresponding to the activated one or more fonts.

19. The one or more non-transitory computer-readable media of claim 18, storing further instructions that, when executed by the computing platform, cause the computing platform to:

monitor the target asset, wherein monitoring the target asset comprises identifying font changes within the target asset; and update, based on identifying the font changes within the target asset, the one or more font activation rules.

20. The one or more non-transitory computer-readable media of claim 18, wherein the one or more font activation rules comprise an executable script, wherein the executable script is configured to automatically activate the one or more fonts specified by the information extracted from the target asset, prior to opening the target asset, based on the computing platform executing the executable script.

* * * * *